United States Patent Office 3,259,543
Patented July 5, 1966

3,259,543
PESTICIDAL KETONE ADDUCTS
Everett E. Gilbert, Morris Township, Morris County, and Pasquale Lombardo, East Hanover Township, Morris County, N.J., assignors to Allied Chemical Corporation, New York, N.Y., a corporation of New York
No Drawing. Filed Mar. 31, 1965, Ser. No. 444,371
16 Claims. (Cl. 167—30)

This application is a continuation-in-part of our application Serial No. 148,856, filed October 31, 1961. The invention relates to new pesticidal compositions containing adducts prepared from the ketone, decachlorooctahydro - 1,3,4-metheno-2H-cyclobuta(cd)pentalen-2-one, and to a method of combatting pests with these new pesticidal compositions.

Decachlorooctahydro - 1,3,4 - metheno-2H-cyclobuta-(cd)pentalen-2-one, hereafter referred to as "ketone," is a complex chlorinated polycyclic ketone having the molecular formula $C_{10}Cl_{10}O$ and a molecular weight of 490.68. It is believed to be most accurately represented by the following "cage" structural formula:

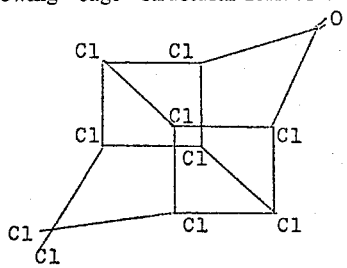

An object of the present invention is to provide new pesticidal compositions containing ketone adducts as active ingredients.

Yet another object of the present invention is to provide a method of combatting pests comprising contacting the pests with new pesticidal compositions containing ketone adducts as active ingredients.

Other objects and advantages of the present invention will be apparent from the following description.

The pesticidal ketone adducts contemplated by this invention comprise those obtained by reacting anhydrous ketone with a member of the group consisting of primary monohydric alcohols, secondary monohydric alcohols, primary monoamines and secondary monoamines. The alcohols and amines may be aliphatic, cycloaliphatic or aromatic and may contain substituents such as alkyl or aryl groups, ether or thioether linkages and halogens. Further, it is intended that the term "primary monoamines" include ammonia. The reactions may be represented as follows:

(1) Alcohol Adducts

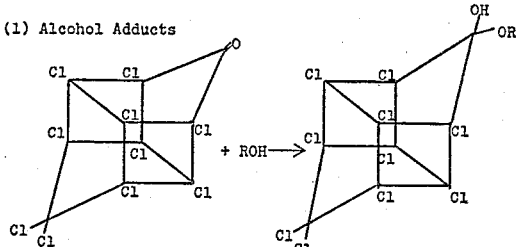

(2) Amine Adducts

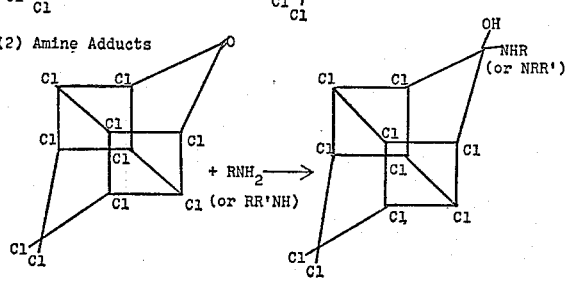

In the above formulas, R and R' represent an aliphatic, cycloaliphatic or aromatic residue.

If the ketone is available in hydrated form, it can be dehydrated by heating it in an oven at temperature of about 135° to 150° C. or by refluxing it with an aromatic solvent such as xylene to remove the water. The water can also be removed by adding an excess of the alcohol or amine followed by distillation to remove the water and excess alcohol or amine.

If desired, the reaction of ketone with alcohol or amine may be carried out in the presence of an inert solvent, preferably an aliphatic or aromatic hydrocarbon or chlorinated hydrocarbon such as chloroform, xylene, toluene, benzene, hexane, petroleum ether, methylene chloride, etc.

Although we prefer to use at least a stoichiometric amount of the alcohol or amine, the desired adduct may be prepared using lower amounts of the alcohol or amine, e.g. down to about 0.25 mol of the alcohol or amine per mol of ketone. In such case, the reaction product comprises the adduct in admixture with unreacted ketone. If a stoichiometric excess of the alcohol or amine is used, the excess can be removed by distillation.

The reaction is carried out at temperature varying from about 40° to 150° C. Preferably, the temperature employed is about 100° C. in the absence of an inert solvent.

The following examples are typical of preparation of the pesticidal ketone adducts of this invention. In the examples, parts are by weight:

EXAMPLE 1

18 parts of purified ketone hydrate (4 mols water) were mixed with 2.8 parts of "Pentasol No. 27" (consisting predominantly of a mixture of primary and secondary amyl alcohols), the amount of alcohol being equimolecular to that of the ketone. The mixture was heated at 90–100° C. for one hour, then at 100°±5° C. for two hours. Heat and vacuum were then applied to remove the water formed. A dark viscous oil resulted which solidified on cooling. Infrared analysis showed that substantially all of the ketone had reacted.

EXAMPLE 2

The procedure of Example 1 was employed, using 18 parts of purified ketone hydrate and an equimolecular amount (3.2 parts) of n-hexylamine. The product was a viscous oil which solidified to a waxy solid on cooling. Infrared analysis showed the product to be the adduct of ketone and n-hexylamine, as evidenced by nitrogen-hydrogen and hydroxyl stretching and the absence of carbonyl absorption.

EXAMPLE 3

The procedure of Example 1 was followed, using 18 parts of ketone hydrate and an equimolecular amount (5.9 parts) of n-dodecylamine, except that the two hour heating at 100°±5° C. was omitted. The liquid product solidified on cooling to a waxy solid. Infrared analysis showed the product to be the adduct of ketone and n-dodecylamine, as evidenced by nitrogen-hydrogen and hydroxyl stretching and the absence of carbonyl absorption.

EXAMPLE 4

50 parts of ketone hydrate were suspended in about 745 parts of chloroform. Gaseous ammonia was bubbled into the suspension, creating a slightly exothermic reaction. Most of the solid material went into solution. Insolubles were filtered off, and chloroform was evaporated. Upon cooling, 29 parts of crystalline ketone-ammonia adduct were obtained. Infrared analysis showed that substantially all of the ketone had reacted.

Purified adducts of ketone and n-butanol, n-hexylamine and aniline were prepared by recrystallization from petroleum ether (30–60° C.) The resulting purified products possessed the following melting points:

|  | ° C. |
|---|---|
| n-Butanol adduct | 162–5 |
| n-Hexylamine adduct | 57–9 |
| Aniline adduct | 161–2 |

Infrared spectra of the adducts differed significantly from that of ketone. All three of the adducts showed hydroxyl stretching at 2.78 microns but no carbonyl absorption. All three adducts showed carbon-hydrogen stretching, the n-butanol adduct at 3.35 and 3.46 microns, the n-hexylamine adduct at 3.39 and 3.47 microns and the aniline adduct at 3.28 microns. In addition, the n-hexylamine adduct showed nitrogen-hydrogen stretching at 2.96 microns, and the aniline adduct showed the same stretching at 2.92 microns. The aniline adduct also showed aromatic ring vibrations at 6.24, 6.61, 6.68 and 6.97 microns.

The adducts of this invention may be applied as pesticides "as is" but are advantageously incorporated as active ingredients in suitable liquid or solid inert pesticidal carriers to provide pesticidal spray or dust compositions.

In particular, we have found that when the alcohol or amine used contains from 4 to 12 carbon atoms, the resulting adducts have exceptionally high toxicity toward pests, including insects and fungi. Accordingly, provision of these adducts constitutes a specific embodiment of this invention.

We have also discovered that the pesticidal adducts of this invention have substantially greater solubility in aromatic solvents than ketone, producing stable solutions of at least about 12% and usually at least about 20% concentration. Moreover, the resulting liquid compositions have far greater resistance to the effect of moisture than liquid ketone compositions.

We have discovered further that wettable powder compositions containing the pesticidal adducts of this invention, unlike conventional wettable powder compositions of ketone, are unaffected by moisture and do not cake in storage.

The liquid pesticidal compositions generally contain in proportions by weight about 10 to 25% of the ketone adduct as active ingredient, about 65 to 88% of an aromatic solvent and about 2 to 10% of a suitable wetting or emulsifying agent, such diglycol oleate, p-isooctyl phenyl ether of polyethylene glycol, blends of alkyl aryl polyether alcohols with alkyl aryl sulfonates and blends of polyoxyethylene sorbitan esters of mixed fatty and resin acids with alkyl aryl sulfonates. The resulting concentrate solution is diluted or admixed with water to form an aqueous dispersion or emulsion suitable for spray application containing about 0.001 to 0.1% by weight of ketone adduct.

Representative aromatic solvents which may be used in preparing the liquid pesticidal compositions include xylene, high aromatic solvents, methylated naphthalenes, heavy aromatic naphtha, etc.

The wettable powder compositions generally contain in proportions by weight about 25 to 75% of the ketone adduct as active ingredient, about 20 to 73% of a finely divided solid carrier and about 2 to 5% of suitable wetting and dispersing agents. Typical wetting agents include polyether sulfonates, alkyl aryl sulfonates, etc. Typical dispersing agents include ligninsulfonates, naphthalene sulfonic acid-formaldehyde condensates, etc.

The wettable powder compositions can readily be prepared by mixing or milling the ketone adduct with the carrier and wetting agent to a typical particle size of from about 3 to 40 microns. The composition is admixed with water to form an aqueous dispersion suitable for spraying containing about 0.001 to 0.1% by weight of ketone adduct.

Representative solid carriers which may be used in preparing the wettable powders include magnesium and aluminum silicates (talc, kaolin clays, attapulgite clays, etc.), carbonates (dolomite, chalk, etc.), materials containing silicic acid (diatomaceous earth), fuller's earth, gypsum, sulfur, etc.

The dosage of the adducts employed depends on the particular organisms to be controlled, field conditions, etc. as known in the art. In any event, sufficient quantities of the adducts are used to provide the desired toxicity.

As shown in the tests set forth below, the ketone-alcohol and ketone-amine adducts of the present invention exhibit outstanding toxicity against insects and/or fungi. The adducts were prepared by reacting anhydrous ketone with an equivalent molar amount of the alcohol or amine. The anhydrous ketone was obtained by dissolving hydrated ketone (3–4 mols water) in xylene and removing the water by azeotroping.

1% acetone solutions of the adduct or ketone, diluted with varying quantities of water, were tested against spores of *Sclerotinia fructicola* (brown rot of stone fruits), produced by growing the fungus on potato dextrose agar plants for one week. Following an incubation period of 24 hours at 65° F., the solutions were examined under a microscope to determine average percent germination of spores at each concentration.

*Table I*

Average percent spore germination at 1000, 100 and 10 p.p.m.

| Sample | 1000 | 100 | 10 |
|---|---|---|---|
| Ketone-n-dodecylamine adduct | 0 | 0 | 0 |
| Ketone, condensate of nonyl phenol and 4-ethylene oxide adduct | 0 | 0 | 0 |
| Ketone-1-butanol adduct | 0 | 0 | 0 |
| Ketone | | 67 | 96 |

Tests on toxicity to pea aphids (*Macrosiphum pisi*) were carried out by removing the pea aphids from infested plants, placing them on a wire screen and spraying them with a formulation of the adduct or ketone. Following treatment, the pea aphids were confined to untreated broad bean plants. Record of kill was made three days after treatment. The formulation used comprised (by volume) 1 part of the adduct or ketone (as an acetone solution comprising 4.8 grams of the adduct or ketone per 100 cc. of solution) per 39 parts acetone plus 40 parts water.

Tests on toxicity to Mexican bean beetle larvae (*Epilachna varivestis*) were carried out by spraying horticultural (cranberry) bean plants with a formulation of the adduct or ketone and allowing the plants to dry. The larvae were confined to the treated foliage by means of wire cages. Record of kill was made three days after treatment. The formulation was prepared by diluting (by volume) one part of the adduct or ketone (as an acetone solution comprising 4.8 grams of the adduct or ketone per 100 cc. of solution) with 319 parts of water.

Tests on southern armyworms (*Prodenis eridania*) were carried out by spraying horiticulural (cranberry) bean plants with a formulation of the adduct or ketone and allowing the plants to dry. The armyworms were confined to the treated foliage by means of wire cages. Mortality count was made three days after treatment. The formulation was prepared by diluting (by volume) one part of the adduct or ketone (as an acetone solution comprising 4.8 grams of the adduct or ketone per 100 cc. of solution) with 639 parts of water.

Table II

| Sample | Percent Kill | | |
|---|---|---|---|
| | Toxicity to Pea Aphids | Toxicity to Mexican Bean Beetle Larvae | Toxicity to Southern Armyworms |
| Ketone, mixed primary amyl alcohols adduct | | | 80 |
| Ketone, mixed branched chain primary amyl alcohols adduct | | 100 | |
| Ketone, 1-butanol adduct | | 100 | |
| Ketone-1-octadecanol adduct | | | 80 |
| Ketone, condensate of nonyl phenol and 4-ethylene oxide adduct | | 100 | |
| Ketone, condensate of n-butylamine and 4-ethylene oxide adduct | | 100 | |
| Ketone, aniline adduct | 100 | | 100 |
| Ketone-cyclohexylamine adduct | 70 | | 100 |
| Ketone-n-hexylamine adduct | 100 | | 100 |
| Ketone-n-dodecylamine adduct | 100 | | 100 |
| Ketone, piperidine adduct | 100 | | |
| Ketone, furfurylamine adduct | 100 | | |
| Ketone, ammonia adduct | | | 100 |
| Ketone | 0 | 80 | 60 |

Although the insecticidal and fungicidal activity of particular ketone adducts has been set forth above, all adducts obtained by reacting anhydrous ketone with a member of the group consisting of (1) aliphatic, cycloaliphatic and aromatic primary monohydric alcohols and secondary monohydric alcohols, preferably containing from 1 to 18 carbon atoms, (2) aliphatic, cycloaliphatic and aromatic primary monoamines and secondary monoamines, preferably containing from 1 to 20 carbon atoms, and (3) ammonia possessing varying degrees of insecticidal and/or fungicidal activity.

The monohydric alcohols employed in producing the adducts include (1) alkyl, cycloalkyl-substituted alkyl and aryl-substituted alkyl primary and secondary monohydric alcohols and (2) cycloalkyl and alkyl-substituted cycloalkyl secondary monohydric alcohols. The monoamines include (1) alkyl, cycloalkyl, cycloalkyl-substituted alkyl and aryl-substituted alkyl primary and secondary monoamines and (2) aryl and alkyl-substituted aryl primary monoamines. Other monohydric alcohols include oxirane condenates obtained by reaction of compounds having an active hydrogen atom such as alcohols, amines and phenols with lower alkylene oxides, preferably ethylene oxide and propylene oxide. The alcohols and amines may be those defined above. The phenols are typified by alkyl phenols in which the alkyl group contains 5 to 15 carbon atoms. The oxirane condensates, which are primary alcohols, are generally produced using 1 to 4 moles of the alkylene oxide per mol of the alcohol, amine or phenol. Other monoamines include furfurylamine, piperidine and ammonia.

As indicated above, we have found that the adducts may be prepared as higher strength liquid pesticidal compositions in aromatic solvents than ketone. At the same time these compositions have greater stability to moisture. Moreover, many of the liquid compositions are more easily emulsifiable in water than ketone. In preparing the liquid compositions, the adducts obtained from primary amyl alcohols are preferred since the primary amyl alcohols are cheap and meet all of the objectives set forth above.

The table set forth below shows solubility and emulsification tests on adducts of this invention. Three types of solubility tests were run:

In Test A, + indicates no separation on standing 24 hours at room temperature as a 25–30% solution (6 grams anhydrous ketone, 1 molecular equivalent of adducting compound (alcohol or amine) and 18 grams of xylene). − indicates separation under these conditions.

In Test B, + indicates no separation of the above solution on standing 24 hours at −18° C. − indicates separation under these conditions. A blank indicates no test was made.

In Test C, + indicates no separation on standing 24 hours at −18° C. from a 40% solution. − indicates separation under thees conditions. A blank indicates no test was made.

In the emulsification test, 9 grams of the solution from solubility Test A was mixed with one gram "Atlox 2081" (an emulsifier comprising a blend of polyoxyethylene sorbitan esters of mixed fatty and resin acids with an alkyl aryl sulfonate). 2 cc. of this solution was added to 98 cc. of hard water (342 p.p.m.) in a glass-stoppered 100 cc. graduated cylinder which was immediately inverted twice. A smooth emulsion was formed if the mixture successfully passed the test. Passing samples were then inverted 30 more times and allowed to stand undisturbed for one hour. No oil or not more than 1 cc. of cream could separate at the bottom or top of the cylinder during this time for the sample to pass the test. The test was repeated with 34 p.p.m. soft water. A sample had to pass the test with both hard and soft waters to be considered acceptable. + indicates that the sample passed. − indicates a failing sample. A blank indicates no test was made.

Table III

| Adducting Compound | Solubility Tests | | | Emulsification Test |
|---|---|---|---|---|
| | A | B | C | |
| Methanol | + | + | − | − |
| 1-propanol | + | + | | − |
| Isopropanol | + | + | | − |
| 1-butanol | + | + | | + |
| 1-pentanol | + | + | + | + |
| Primary amyl alcohol | + | + | + | + |
| Isoamyl alcohol | + | + | | − |
| 3-pentanol | + | + | | + |
| 2-methyl-1-butanol | + | + | | + |
| Cyclopentanol | + | + | | − |
| 2-hexanol | + | + | | − |
| 2-ethyl-1-butanol | + | + | + | + |
| Cyclohexanol | + | + | + | + |
| 1-heptanol | + | + | | + |
| 3-methylcyclohexanol | + | + | | − |
| Methyl cyclopentyl carbinol | + | + | | − |
| Cyclohexyl methanol | + | + | | − |
| Benzyl alcohol | + | + | | − |
| 1-octanol | + | + | | + |
| 2-ethyl-4-methyl-1-pentanol | + | + | | + |
| Phenethyl alcohol | + | + | | − |
| Methyl benzyl alcohol | + | + | | + |
| 1-decanol | + | + | | + |
| 2-sec-butyl-cyclohexanol | + | + | | + |
| 2,6,8-trimethyl-4-nonanol | + | + | | + |
| 2-cyclohexyl-cyclohexanol | + | + | | + |
| 1-octadecanol | + | + | | + |
| Dimethylamine | + | − | | − |
| n-Propylamine | + | + | | |
| Isopropylamine | + | + | | − |
| t-Butylamine | + | + | | |
| n-Amylamine | + | + | | − |
| Furfurylamine | + | − | | − |
| Piperidine | + | + | | − |
| Aniline | + | + | | − |
| n-Hexylamine | + | + | | + |
| di-n-propylamine | + | + | | + |
| Cyclohexylamine | + | + | | − |
| n-Heptylamine | + | + | | + |
| Benzylamine | + | | | − |
| o-Toluidine | + | | | − |
| n-Octylamine | + | + | | + |
| 2-ethylhexylamine | + | + | | + |
| n-Methylbenzylamine | + | + | | − |
| α-phenylethylamine | + | + | | + |
| di-sec-butylamine | + | + | | + |
| Dodecylamine | + | + | | + |
| Tetradecylamine | + | + | | − |
| Hexadecylamine | + | + | | + |
| Dihydroabietylamine | + | + | | + |
| Condensate of methanol and 2-ethylene oxide | + | + | | − |
| Condensate of ethanol and 2-ethylene oxide | + | + | | − |
| Condensate of nonyl phenol and 4-ethylene oxide | + | + | | + |
| Condensate of n-ethyl aniline and 1-ethylene oxide | + | + | | − |
| Condensate of di-(n-butyl) amine and 1-ethylene oxide | + | + | | − |
| Condensate of diethylamine and 1-ethylene oxide | + | + | | − |
| Condensate of n-butylamine and 2-ethylene oxide | + | + | | + |
| Condensate of di-(n-butyl) amine and 1-propylene oxide | + | + | | + |
| Condensate of ammonia and 2-propylene oxide | + | + | | |

In making the liquid compositions of this invention, it is preferred to use alcohols and amines derived from hydrocarbons. As shown in the table above, various oxirane condensates which are primary alcohols may also be used although none of them is derived from a hydrocarbon.

The following wettable powder pesticidal compositions are typical of those contemplated by the present invention.

|  | Sample #1 (weight percent) | Sample #2 (weight percent) | Sample #3 (weight percent) |
|---|---|---|---|
| Adduct of ketone and "Pentasol #27" | 40.0 | | |
| Adduct of ketone and n-hexylamine | | 40.0 | |
| Adduct of ketone and n-dodecylamine | | | 40.0 |
| "Attaclay X-250" (an attapulgite clay carrier) | 56.3 | 56.3 | 56.3 |
| "Polyfon F" (a lignin-sulfonate dispersing agent) | 2.0 | 2.0 | 2.0 |
| "Novonacco" (a modified alkyl naphthalene sulfonate wetting agent) | 1.7 | 1.7 | 1.7 |

The following emulsifiable concentrate pesticidal compositions are typical of those contemplated by the present invention.

|  | Sample #1 (weight percent) | Sample #2 (weight percent) | Sample #3 (weight percent) |
|---|---|---|---|
| Adduct of ketone and "Pentasol #27" | 25 | | |
| Adduct of ketone and n-hexylamine | | 25 | |
| Adduct of ketone and n-dodecylamine | | | 30 |
| Xylene | 65 | 65 | 60 |
| "Toximul R" (an emulsifier comprising a blend of an alkyl aryl polyether alcohol with an alkyl aryl sulfonate) | | 10 | 10 |
| "Atlox G8916DJ/3300" (an emulsifier comprising a blend of polyoxyethylene sorbitan esters of mixed fatty and resin acids with an alkyl aryl sulfonate) | 10 | | |

Since various changes and modifications may be made in this invention without departing from the spirit thereof, the invention is deemed to be limited only by the scope of the appended claims.

We claim:
1. A pesticidal composition comprising an adduct of decachlorooctahydro - 1,3,4 - metheno - 2H - cyclobuta-(cd)pentalen-2-one and a member of the group consisting of (1) alkyl, cycloalkyl-substituted alkyl and monocyclic aryl-substituted alkyl primary and secondary monohydric alcohols containing from 1 to 18 carbon atoms, (2) cycloalkyl and alkyl-substituted cycloalkyl secondary monohydric alcohols containing from 1 to 18 carbon atoms, (3) alkyl, cycloalkyl, cycloalkyl-substituted alkyl and monocyclic aryl-substituted alkyl primary and secondary monoamines containing from 1 to 20 carbon atoms, (4) monocyclic aryl and alkyl-substituted monocyclic aryl primary monoamines containing from 1 to 20 carbon atoms, (5) condensates obtained by reaction of a member of the group consisting of alkyl-substituted phenols in which the alkyl group contains 5 to 15 carbon atoms, lower alkyl primary monohydric alcohols, lower alkyl primary and secondary monoamines and ammonia with a lower alkylene oxide, (6) furfurylamine, (7) piperidine, and (8) ammonia as active ingredient, together with an inert pesticidal carrier therefor and at least one of wetting, emulsifying and dispersing agents.

2. A pesticidal composition comprising an adduct of decachlorooctahydro - 1,3,4 - metheno - 2H - cyclobuta-(cd)pentalen-2-one and a member of the group consisting of alkyl, cycloalkyl-sustituted alkyl and monocyclic aryl-substituted alkyl primary monohydric alcohols containing from 1 to 18 carbon atoms as active ingredient, together with an inert pesticidal carrier therefor and at least one of wetting, emulsifying and dispersing agents.

3. A pesticidal composition comprising an adduct of decachlorooctahydro - 1,3,4 - metheno - 2H - cyclobuta-(cd)pentalen-2-one and a member of the group consisting of alkyl, cycloalkyl-substituted alkyl, monocyclic aryl-substituted alkyl, cycloalkyl and alkyl-substituted cycloalkyl secondary monohydric alcohols containing from 1 to 18 carbon atoms as active ingredient, together with an inert pesticidal carrier therefor and at least one of wetting, emulsifying and dispersing agents.

4. A pesticidal composition comprising an adduct of decachlorooctahydro - 1,3,4 - metheno - 2H - cyclobuta-(cd)pentalen-2-one and a member of the group consisting of alkyl, cycloalkyl, cycloalkyl-substituted alkyl, monocyclic aryl-substituted alkyl, monocyclic aryl and alkyl-substituted monocyclic aryl primary monoamines containing from 1 to 20 carbon atoms as active ingredient, together with an inert pesticidal carrier therefor and at least one of wetting, emulsifying and dispersing agents.

5. A pesticidal composition comprising an adduct of decachlorooctahydro - 1,3,4 - metheno - 2H - cyclobuta-(cd)pentalen-2-one and a member of the group consisting of alkyl, cycloalkyl, cycloalkyl-substituted alkyl and monocyclic aryl-substituted alkyl secondary monoamines containing from 1 to 20 carbon atoms as active ingredient, together with an inert pesticidal carrier therefor and at least one of wetting, emulsifying and dispersing agents.

6. A pesticidal composition comprising an adduct of decachlorooctahydro - 1,3,4 - metheno - 2H - cyclobuta-(cd)pentalen-2-one and a primary amyl alcohol as active ingredient, together with an inert pesticidal carrier therefor and at least one of wetting, emulsifying and dispersing agents.

7. A pesticidal composition comprising an adduct of decachlorooctahydro - 1,3,4 - metheno - 2H - cyclobuta-(cd)pentalen-2-one and ammonia as active ingredient, together with an inert pesticidal carrier therefore.

8. A liquid pesticidal composition comprising an adduct of decachlorooctahydro - 1,3,4 - metheno - 2H-cyclobuta(cd)pentalen-2-one and a member of the group consisting of (1) alkyl, cycloalkyl-substituted alkyl and monocyclic aryl-substituted alkyl primary and secondary monohydric alcohols containing from 1 to 18 carbon atoms, (2) cycloalkyl and alkyl-substituted cycloalkyl secondary monohydric alcohols containing from 1 to 18 carbon atoms, (3) alkyl, cycloalkyl, cycloalkyl-substituted alkyl and monocyclic aryl-substituted alkyl primary and secondary monoamines containing from 1 to 20 carbon atoms, (4) monocyclic aryl and alkyl-substituted monocyclic aryl primary monoamines containing from 1 to 20 carbon atoms, (5) condensates obtained by reaction of a member of the group consisting of alkyl-substituted phenols in which the alkyl group contains 5 to 15 carbon atoms, lower alkyl primary monohydric alcohols, lower alkyl primary and secondary monoamines and ammonia with a lower alkylene oxide, (6) furfurylamine, (7) piperidine, and (8) ammonia as active ingredient, in an aromatic solvent as inert pesticidal carrier and a wetting or emulsifying agent.

9. A wettable powder pesticidal composition comprising (1) an adduct of decachlorooctahydro-1,3,4-metheno-2H-cyclobuta(cd)pentalen-2-one and a member of the group consisting of (a) alkyl, cycloalkyl-substituted alkyl and monocyclic aryl-substituted alkyl primary and secondary monohydric alcohols containing from 1 to 18 carbon atoms, (b) cycloalkyl and alkyl-substituted cycloalkyl secondary monohydric alcohols containing from 1 to 18 carbon atoms, (c) alkyl, cycloalkyl, cycloalkyl-substituted alkyl and monocyclic aryl-substituted alkyl primary and secondary monoamines containing from 1 to 20 carbon atoms, (d) monocyclic aryl and alkyl-substituted monocyclic aryl primary monoamines containing from 1 to 20 carbon atoms, (e) condensates obtained by reaction of a member of the group consisting of alkyl-substituted phenols in which the alkyl group contains 5 to 15 carbon atoms, lower alkyl primary monohydric alcohols, lower alkyl primary and secondary monoamines and ammonia with a lower alkylene oxide, (f) furfurylamine, (g) piperidine, and (h) ammonia as active ingredient, and (2) a finely divided solid as inert pesticidal carrier.

10. A process for combatting pests of the group consisting of insects and fungi which comprises contacting the pests with a composition comprising an adduct of decachlorooctahydro - 1,3,4 - metheno - 2H - cyclobuta-(cd)pentalen-2-one and a member of the group consisting of (1) alkyl, cycloalkyl-substituted alkyl and monocyclic aryl-substituted alkyl primary and secondary monohydric alcohols containing from 1 to 18 carbon atoms, (2) cycloalkyl and alkyl-substituted cycloalkyl secondary monohydric alcohols containing from 1 to 18 carbon atoms, (3) alkyl, cycloalkyl, cycloalkyl-substituted alkyl and monocyclic aryl-substituted alkyl primary and secondary monoamines containing from 1 to 20 carbon atoms, (4) monocyclic aryl and alkyl-substituted monocyclic aryl primary monoamines containing from 1 to 20 carbon atoms, (5) condensates obtained by reaction of a member of the group consisting of alkyl-substituted phenols in which the alkyl group contains 5 to 15 carbon atoms, lower alkyl primary monohydric alcohols, lower alkyl primary and secondary monoamines and ammonia with a lower alkylene oxide, (6) furfurylamine, (7) piperidine, and (8) ammonia as active ingredient.

11. A process for combatting pests of the group consisting of insects and fungi which comprises contacting the pests with a composition comprising an adduct of decachlorooctahydro - 1,3,4 - metheno - 2H - cyclobuta-(cd)pentalen-2-one and a member of the group consisting of alkyl, cycloalkyl-substituted alkyl and monocyclic aryl-substituted alkyl primary monohydric alcohols containing from 1 to 18 carbon atoms as active ingredient.

12. A process for combatting pests of the group consisting of insects and fungi which comprises contacting the pests with a composition comprising an adduct of decachlorooctahydro - 1,3,4 - metheno - 2H - cyclobuta-(cd)pentalen-2-one and a member of the group consisting of alkyl, cycloalkyl-substituted alkyl, monocyclic aryl-substituted alkyl, cycloalkyl and alkyl-substituted cycloalkyl secondary monohydric alcohols containing from 1 to 18 carbon atoms as active ingredient.

13. A process for combatting pests of the group consisting of insects and fungi which comprises contacting the pests with a composition comprising an adduct of decachlorooctahydro - 1,3,4 - metheno - 2H - cyclobuta-(cd)pentalen-2-one and a member of the group consisting of alkyl, cycloalkyl, cycloalkyl-substituted alkyl, monocyclic aryl-substituted alkyl, monocyclic aryl and alkyl-substituted monocyclic aryl primary monoamines containing from 1 to 20 carbon atoms as active ingredient.

14. A process for combatting pests of the group consisting of insects and fungi which comprises contacting the pests with a composition comprising an adduct of decachlorooctahydro - 1,3,4 - metheno - 2H - cyclobuta-(cd)pentalen-2-one and a member of the group consisting of alkyl, cycloalkyl, cycloalkyl-substituted alkyl and monocyclic aryl-substituted alkyl secondary monoamines containing from 1 to 20 carbon atoms as active ingredient.

15. A process for combatting pests of the group consisting of insects and fungi which comprises contacting the pests with a composition comprising an adduct of decachlorooctahydro - 1,3,4 - metheno - 2H - cyclobuta-(cd)pentalen-2-one and a primary amyl alcohol as active ingredient.

16. A process for combatting pests of the group consisting of insects and fungi which comprises contacting the pests with a composition comprising an adduct of decachlorooctahydro - 1,3,4 - metheno - 2H - cyclobuta-(cd)pentalen-2-one and ammonia as active ingredient.

References Cited by the Examiner
UNITED STATES PATENTS
3,055,948   9/1962   Hoch _____ 260—611

OTHER REFERENCES

McBee et al.: J. Am. Chem. Soc., vol 78, pages 1511–1512, 1956.

JULIAN S. LEVITT, *Primary Examiner.*

S. J. FRIEDMAN, *Assistant Examiner.*